US010644305B2

(12) United States Patent
Huang et al.

(10) Patent No.: US 10,644,305 B2
(45) Date of Patent: May 5, 2020

(54) BATTERY ELECTRODE STRUCTURE AND METHOD FOR FABRICATING THE SAME

(71) Applicant: INDUSTRIAL TECHNOLOGY RESEARCH INSTITUTE, Chutung, Hsinchu (TW)

(72) Inventors: Wei-Chin Huang, Tainan (TW); Chuan-Sheng Chuang, Tainan (TW); De-Yau Lin, Tainan (TW); Sung-Ho Liu, Kaohsiung (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 517 days.

(21) Appl. No.: 15/395,616

(22) Filed: Dec. 30, 2016

(65) Prior Publication Data

US 2018/0151864 A1 May 31, 2018

(30) Foreign Application Priority Data

Nov. 25, 2016 (TW) .............................. 105138869 A

(51) Int. Cl.
*H01M 4/131* (2010.01)
*H01M 4/485* (2010.01)
(Continued)

(52) U.S. Cl.
CPC ............. *H01M 4/131* (2013.01); *B22F 3/105* (2013.01); *B22F 3/1055* (2013.01); *B22F 7/08* (2013.01);
(Continued)

(58) Field of Classification Search
CPC .. H01M 4/131; H01M 4/0402; H01M 4/0471; H01M 4/136; H01M 4/1391;
(Continued)

(56) References Cited

U.S. PATENT DOCUMENTS

| 4,760,041 A | 7/1988 | Beaver et al. |
| 5,494,762 A | 2/1996 | Isoyama et al. |

(Continued)

FOREIGN PATENT DOCUMENTS

| CN | 101233628 A | 7/2005 |
| CN | 1691371 A | 11/2005 |

(Continued)

OTHER PUBLICATIONS

Yao et al., "Interconnected Silicon Hollow Nanospheres for Lithium-Ion Battery Anodes with Long Cycle Life," American Chemical Society, Nano Letters, 2011, vol. 11, pp. 2949-2954.

(Continued)

*Primary Examiner* — Jimmy Vo
(74) *Attorney, Agent, or Firm* — Muncy, Geissler, Olds & Lowe, P.C.

(57) ABSTRACT

A battery electrode structure includes a substrate, a first conductive layer and a plurality of active particles. The substrate has a substrate surface. The first conductive layer is disposed on the substrate surface. Each of the active particles has a first portion conformally engaged with a surface of the first conductive layer and a second portion protruding outwards from the surface of the first conductive layer.

17 Claims, 11 Drawing Sheets

(51) Int. Cl.

| | | |
|---|---|---|
| *B22F 7/08* | (2006.01) | |
| *B22F 3/105* | (2006.01) | |
| *B23K 9/04* | (2006.01) | |
| *B23K 9/23* | (2006.01) | |
| *B23K 15/00* | (2006.01) | |
| *B23K 26/00* | (2014.01) | |
| *B23K 26/34* | (2014.01) | |
| *H01M 4/04* | (2006.01) | |
| *H01M 4/136* | (2010.01) | |
| *H01M 4/1391* | (2010.01) | |
| *H01M 4/1397* | (2010.01) | |
| *H01M 4/505* | (2010.01) | |
| *H01M 4/525* | (2010.01) | |
| *H01M 4/58* | (2010.01) | |
| *H01M 10/0525* | (2010.01) | |
| *B23K 101/34* | (2006.01) | |
| *B23K 103/00* | (2006.01) | |
| *B33Y 80/00* | (2015.01) | |
| *B33Y 10/00* | (2015.01) | |

(52) U.S. Cl.
CPC ............ *B23K 9/04* (2013.01); *B23K 9/23* (2013.01); *B23K 15/0086* (2013.01); *B23K 15/0093* (2013.01); *B23K 26/0006* (2013.01); *B23K 26/34* (2013.01); *H01M 4/0402* (2013.01); *H01M 4/0471* (2013.01); *H01M 4/136* (2013.01); *H01M 4/1391* (2013.01); *H01M 4/1397* (2013.01); *H01M 4/485* (2013.01); *H01M 4/505* (2013.01); *H01M 4/525* (2013.01); *H01M 4/5825* (2013.01); *H01M 10/0525* (2013.01); *B22F 2003/1051* (2013.01); *B22F 2302/25* (2013.01); *B22F 2302/45* (2013.01); *B22F 2998/10* (2013.01); *B23K 2101/34* (2018.08); *B23K 2103/52* (2018.08); *B33Y 10/00* (2014.12); *B33Y 80/00* (2014.12); *H01M 2220/30* (2013.01); *Y02E 60/122* (2013.01); *Y02T 10/7011* (2013.01)

(58) Field of Classification Search
CPC .... H01M 4/1397; H01M 4/485; H01M 4/505; H01M 4/525; H01M 4/5825; H01M 10/0525

See application file for complete search history.

(56) References Cited

U.S. PATENT DOCUMENTS

| | | |
|---|---|---|
| 5,753,171 A | 5/1998 | Serbin et al. |
| 6,171,726 B1 | 1/2001 | Reichman et al. |
| 6,198,621 B1 | 3/2001 | Saito et al. |
| 6,251,488 B1 | 6/2001 | Miller et al. |
| 6,676,892 B2 | 1/2004 | Das et al. |
| 6,677,554 B2 | 1/2004 | Darrah et al. |
| 6,863,699 B1 | 3/2005 | Krasnov et al. |
| 7,238,446 B2 | 7/2007 | Ovshinsky et al. |
| 8,034,279 B2 | 10/2011 | Dimter et al. |
| 8,083,989 B2 | 12/2011 | Yamaoka et al. |
| 8,221,850 B2 | 7/2012 | Fuwa |
| 8,309,880 B2 | 11/2012 | Chung |
| 8,870,974 B2 | 10/2014 | Nieh et al. |
| 8,962,098 B2 | 2/2015 | Uchida |
| 9,166,230 B1 * | 10/2015 | Lahiri ............... H01M 10/4235 |
| 2006/0263686 A1 | 11/2006 | Zhao |
| 2008/0261113 A1 | 10/2008 | Huang et al. |
| 2011/0241947 A1 | 10/2011 | Scott et al. |
| 2013/0252086 A1 | 9/2013 | Stern et al. |
| 2013/0277619 A1 | 10/2013 | Gopukumar et al. |
| 2013/0302674 A1 | 11/2013 | Stern et al. |
| 2013/0344391 A1 | 12/2013 | Yushin et al. |
| 2014/0308587 A1 | 10/2014 | Mazumder |
| 2014/0332718 A1 | 11/2014 | Kojima et al. |
| 2015/0056387 A1 | 2/2015 | Dadheech et al. |
| 2015/0056493 A1 | 2/2015 | Dadheech et al. |
| 2016/0013480 A1 | 1/2016 | Sikha et al. |

FOREIGN PATENT DOCUMENTS

| | | |
|---|---|---|
| CN | 105074979 A | 11/2005 |
| CN | 102618097 A | 8/2012 |
| CN | 203236123 U | 10/2013 |
| CN | 103443965 A | 12/2013 |
| CN | 103928711 A | 7/2014 |
| CN | 203850378 U | 9/2014 |
| CN | 203936519 U | 11/2014 |
| TW | I475622 B | 3/2015 |

OTHER PUBLICATIONS

Zhang et al., "Nanosized Tin Anode Prepared by Laser-Induced Vapor Deposition for Lithium Ion Battery," Journal of Power Sources 174 (2007) pp. 770-773.

Kuwata et al., "Thin-film Lithium-Ion Battery with Amorphous Solid Electrolyte Fabricated by Pulsed Laser Deposition," Electrochemistry Communications, vol. 6, (2004) pp. 417-421.

Doh et al., "A New Composite Anode, Fe—Cu—Si/C for Lithium Ion Battery," Journal of Alloys and Compounds, vol. 461, (2008), pp. 321-325.

Veluchamy et al., "Silicon Based Comosite Anode for Lithium Ion Battery," InTech, Aug. 9, 2011, Chapter 14, pp. 335-360.

* cited by examiner

BATTERY ELECTRODE STRUCTURE AND METHOD FOR FABRICATING THE SAME

CROSS REFERENCE TO RELATED APPLICATIONS

This application claims the benefit of Taiwan application Serial No. 105138869, filed Nov. 25, 2016, the subject matter of which is incorporated herein by reference.

TECHNICAL FIELD

The disclosure relates in general to a battery electrode structure and method for fabricating the same.

BACKGROUND

Along with the development of information communication technology, portable electronic devices are required to be thinner, lighter, and more compact. Batteries for satisfying the requirements or design trends are thus provided. A secondary battery that is a rechargeable battery with advantages of high energy density, high operating voltage and long cycle life is widely applied in portable electronic devices, such as cell phones and notebook, as well as electric vehicles serving as the power supply.

A lithium battery as an example, a typical secondary battery includes an anode, a cathode, electrolyte solution and a barrier disposed between the anode and the cathode and allowing the lithium ions and protons transported from the anode to the cathode. However, when the lithium ions are transported from the cathode active material (such as lithium composite metal oxides) to the cathode active material (such as graphene-based materials), oxidation-reduction reaction may take place simultaneously to release electric current and generate intercalation in the anode interlayers. The conventional cathode electrode and anode electrode are generally formed by a paste preparation and coating technology to coat a mixture including the cathode active material/the cathode active material, conductive carbon black and adhesives onto a conductive board.

Because the battery capacity may be depended upon the granule compaction of the cathode active material or the cathode active material coated on the conductive board. How to form a secondary battery with high granule compaction of the cathode active material or the cathode active material to increase the battery capacity is still a challenge to the pertinent industry. Furthermore, since the charge transfer efficiency of the secondary battery may be deteriorated by the adhesive mixed with the cathode active material or the cathode active material for forming the cathode or anode, thus it may be difficult to achieve the goal of improving the battery capacity by increasing the thickness of the cathode active material or the cathode active material coated on the conductive board.

Therefore, there is a need of providing a battery electrode structure with high granule compaction of the cathode active material or the cathode active material and less adhesive as well as the method.

SUMMARY

According to one embodiment of the present disclosure, a battery electrode structure is provided, wherein the battery electrode structure includes a substrate, a first conductive layer and a plurality of active particles. The substrate has a substrate surface. The first conductive layer is disposed on the substrate surface. Each of the active particles has a first portion conformally engaged with a surface of the first conductive layer and a second portion protruding outwards from the surface of the first conductive layer.

According to another embodiment of the present disclosure, a method for fabricating a battery electrode structure is provided, wherein the method includes steps as follows: A substrate having a substrate surface is firstly provided, and a first conductive layer is then formed on the substrate surface. Subsequently, a plurality of active particles disposed on a surface of the first conductive layer are sintered/melted so as to make each of the active particles having a first portion conformally engaged with the surface of the first conductive layer and a second portion protruding outwards from the surface of the first conductive layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1A:
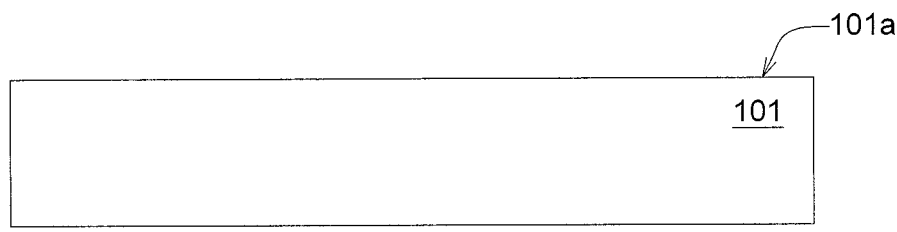
FIGS. 1A to 1E are cross-sectional views illustrating the method for fabricating a battery electrode structure according to one embodiment of the present disclosure.

According to the present disclosure, a battery electrode structure and the method for fabricating the same are provided. A number of embodiments of the present disclosure are disclosed below with reference to accompanying drawings.

However, the structure and content disclosed in the embodiments are for exemplary and explanatory purposes only, and the scope of protection of the present disclosure is not limited to the embodiments. Designations common to the accompanying drawings and embodiments are used to indicate identical or similar elements. It should be noted that the present disclosure does not illustrate all possible embodiments, and anyone skilled in the technology field of the invention will be able to make suitable modifications or changes based on the specification disclosed below to meet actual needs without breaching the spirit of the invention. The present disclosure is applicable to other implementations not disclosed in the specification. In addition, the drawings are simplified such that the content of the embodiments can be clearly described, and the shapes, sizes and scales of elements are schematically shown in the drawings for explanatory and exemplary purposes only, not for limiting the scope of protection of the present disclosure.

FIGS. 1A to 1E are cross-sectional views illustrating the method for fabricating a battery electrode structure 100 according to one embodiment of the present disclosure. The method for fabricating the battery electrode structure 100 includes steps as follows: A substrate 101 (as shown in FIG. 1A) is firstly provided. In some embodiments of the present disclosure, the substrate 101 of the battery electrode structure 100 can be a conductive board, such as a metal sheet containing copper (Cu), aluminum (Al) or other suitable metal elements.

Figure 1B:
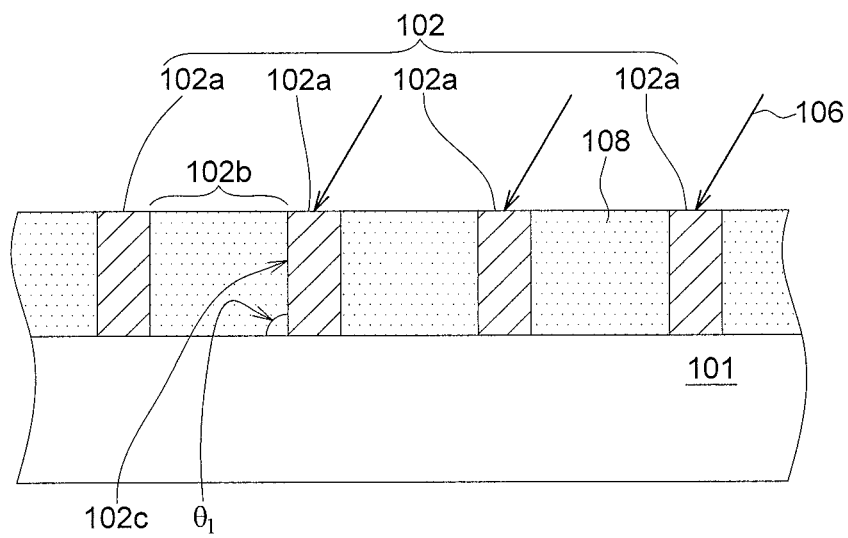
Figure 1C:
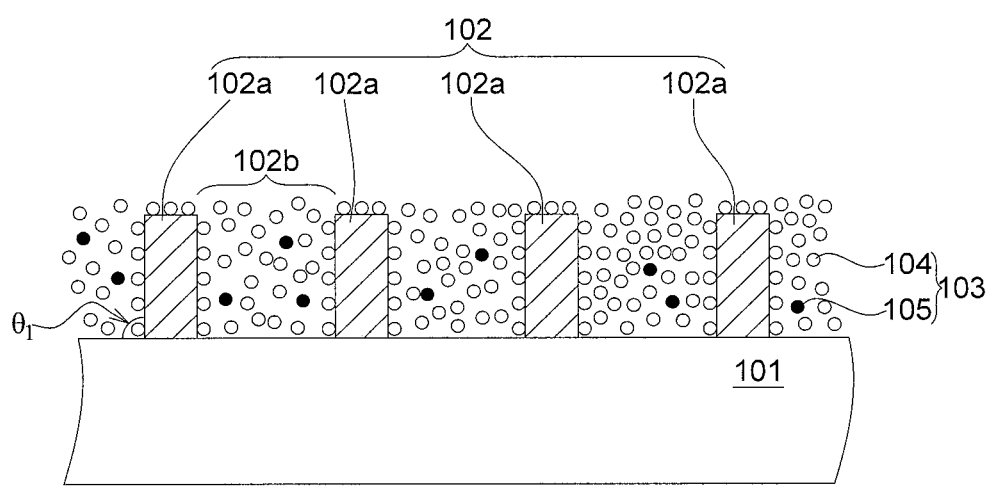

A patterned conductive layer 102 is then formed on a surface 101a of the substrate 101 (see FIG. 1B). In some embodiments of the present disclosure, the patterned conductive layer 102 can be formed by following steps: A conductive powder 108 (including metal materials, such titanium (Ti), gold (Au), silver (Ag), iron (Fe), Al, Cu or the alloys constituted by the arbitrary combinations thereof) is provided to cover on the surface 101a of the substrate 101. A focused beam of energy 106, such as a laser beam, an electron beam, an arc energy or the arbitrary combinations thereof is directed to the surface 101a of the substrate 101 for sintering or melting the conductive powder 108. Subsequently, the unsintered and unmelted portion of the conductive powder 108 is removed.

In some embodiments of the present disclosure, the conductive powder 108 disposed on the surface 101a of the substrate 101 may not be thoroughly subjected to the focused beam of energy 106. Merely a predestined portion of the conductive powder 108 disposed on the surface 101a of the substrate 101 can be subjected to the focused beam of energy 106. The focused beam of energy 106 may be directed to the surface 101a of the substrate 101 according to a predetermined laser scanning path. In other words, the focused beam of energy 106 may be focused on some predetermined area of the surface 101a of the substrate 101, and only the portion of the conductive powder 108 disposed on the predetermined area of the substrate 101 can be sintered or melted to form a plurality of metal bumpings 102a on the surface 101a of the substrate 101 and then collectively form a patterned conductive layer 102.

The way of providing the focused beam of energy 106 to sinter or melt the conductive powder 108 includes steps of performing an air plasma spray (APS) process, a selective laser sintering (SLS) process, a direct metal laser sintering (DMSL) process, a selective laser melting (SLM) process, an electron beam melting (EBM) process or the arbitrary combinations thereof to sinter or melt the conductive powder 108 and then curing the sintered or melted conductive powder 108. In the present embodiment, a 40 W long pulsed laser is provided to sinter or melt the conductive powder 108, whereby a patterned conductive layer 102 is form on the surface 101a of the substrate 101 by the sintered or melted conductive powder 108.

However, it should be appreciated that the method for forming the patterned conductive layer 102 may not be limited to this regards. For example, the patterned conductive layer 102 may be formed by an alternative method set forth as follows: A conductive material layer (not shown) is firstly formed on the surface 101a of the substrate 101 by a deposition process, such as a chemical vapor deposition (CVD). A portion of the conductive material layer is then removed by a lithography/etching process, whereby the patterned conductive layer 102 including the metal bumpings 102a is formed on the surface 101a of the substrate 101.

Each of the metal bumpings 102a of the patterned conductive layer 102 has at least one vertical sidewall 102c that can form a non-straight angle θ with the surface 101a of the substrate 101. For example, in the present embodiment, each of the metal bumpings 102a of the patterned conductive layer 102 has a vertical sidewall 102c perpendicular to the surface 101a of the substrate 101, so as to form a non-straight angle θ1 of 90° with the surface 101a of the substrate 101. However, the shape of the metal bumpings 102a may not be limited to this regards, the shape of the metal bumpings 102a may vary in accordance with the different designs of the battery electrode structure 100.

Figure 2A:
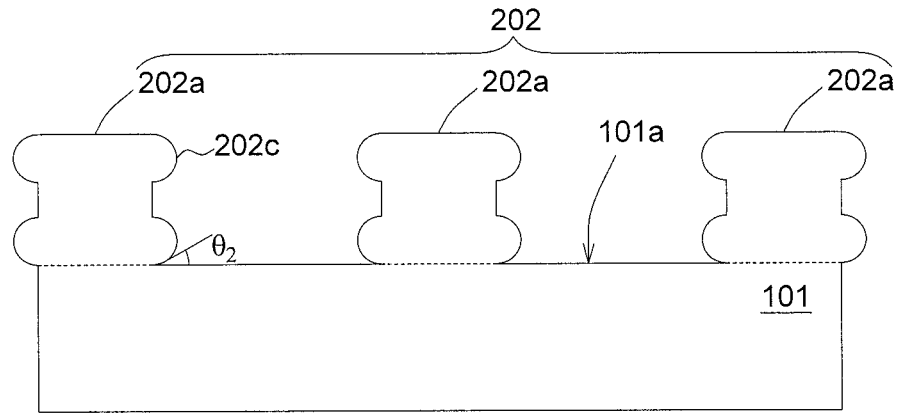
FIGS. 2A to 2C are cross-sectional views illustrating different patterned conductive layers according to various embodiments of the present disclosure.
Figure 2B:
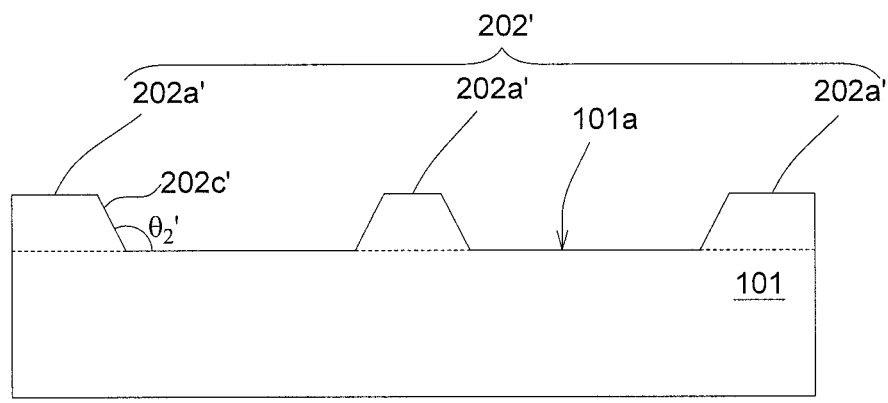
Figure 2C:
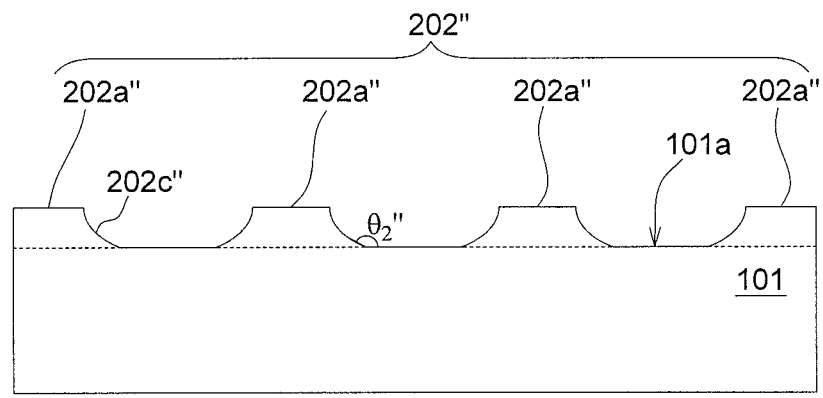

FIGS. 2A to 2C are cross-sectional views illustrating different patterned conductive layers 202, 202', and 202" according to various embodiments of the present disclosure. The metal bumpings 202a, 202a' and 202a" as shown in these embodiments, have different shapes. The vertical sidewalls of the various metal bumpings 202a, 202a' and 202a" can have a flat surface (see the vertical sidewall 202c' in FIG. 2B), a curved surface (see the vertical sidewall 202c" in FIG. 2C) or a the combination of thereof (see the vertical sidewall 202c in FIG. 2A). The vertical sidewalls 202c, 202c' and 202c" of the metal bumpings 202a, 202a' and 202a" have a cross-sectional profile forming an angle non-straight angle θ2, θ2' and θ2" with the surface 101a of the substrate 101, respectively.

The metal bumpings 102a of the patterned conductive layer 102 can also be collectively referred to as a grid structure on the surface 101a of the substrate 101, wherein a portion of the surface 101a of the substrate 101 can be exposed from the openings 102b of the grid structure. In some embodiments of the present disclosure, the openings 102b of the grid structure may have an average width ranging from 10 micrometers (μm) to 200 μm. The arrangement of the grid structure may be varied indifferent embodiments of the present disclosure. FIGS. 3A to 3D are top views illustrating different patterned conductive layers 302, 302', 302" and 302'" according to various embodiments of the present disclosure.

Figure 3A:
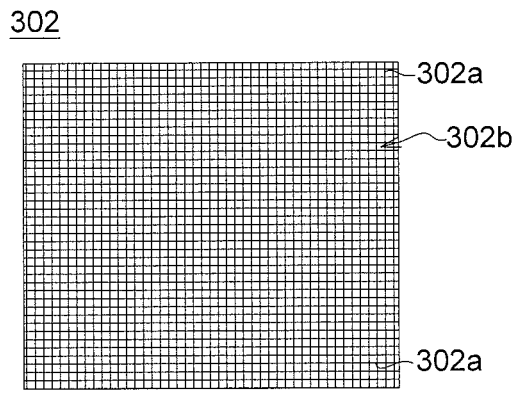
FIGS. 3A to 3D are top views illustrating different patterned conductive layers according to various embodiments of the present disclosure.
Figure 3B:
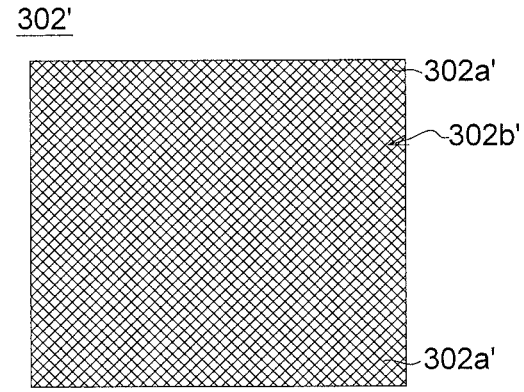
Figure 3C:
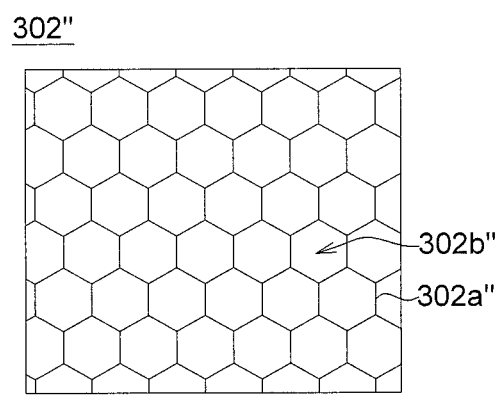
Figure 3D:
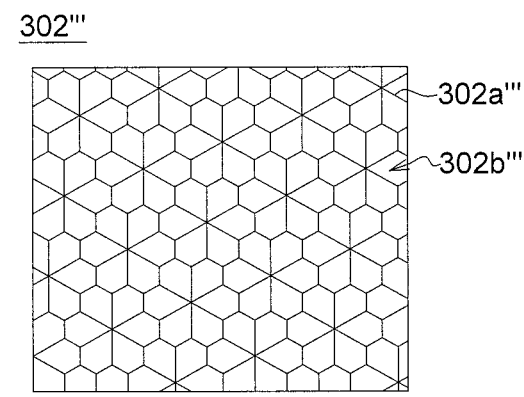

In the embodiment of FIG. 3A, the metal bumpings 302a used to constitute the grid structure are shaped as a plurality of long straight bars and arranged in an orthogonal array, wherein the grid structure has a plurality of square openings 302a arranged regularly and having an identical size. In the embodiment of FIG. 3B, the metal bumpings 302a' used to constitute the grid structure are shaped as a plurality of long straight bars and intersected with each other, wherein the grid structure has a plurality of diamond-shaped openings 302a' arranged regularly and having an identical size. In the embodiment of FIG. 3C, the metal bumpings 302a" used to constitute the grid structure are arranged to form a meshed layer, wherein the grid structure has a plurality hexagonal openings 302a" arranged regularly and having an identical size. In the embodiment of FIG. 3D, the metal bumpings 302a''' used to constitute the grid structure are arranged to form a meshed layer, wherein the grid structure has a plurality pentagonal openings 302a''' with two long edges, arranged regularly and having an identical size.

It should be noted that the arrangement of the grid structure formed in the patterned conductive layer 102 may not be limited to this regards. In some other embodiments of the present disclosure, the grid structure may include a plurality of openings arranged either regularly or irregularly and having identical or different sizes and shapes.

Next, an active material powder 103 including a plurality of active particles 104 is provided to cover the patterned conductive layer 102 and the portion of the surface 101a of the substrate 101 exposed from the openings 102b (as shown in FIG. 10). In some embodiments of the present disclosure, each of the active particles 104 may include an anode material which can be one of lithium (Li), carbon (C), silicon (Si), magnesium (Mg), Cu, nickel (Ni), Al, Ti, tin (Sn), the alloys and the oxide components thereof. For example, the active particles 104 can be porous Si—C ceramic particles, Si—C—Cu ceramic particles, Si—Cu ceramic particles, Mg/Ni/Si ceramic particles, Mg/Ni alloy particles, or the arbitrary combinations thereof. The active particles 104 may have an average grain size ranging from 1 μm to 10 μm.

In some other embodiments of the present disclosure, each of the active particles 104 may include a cathode material which can be selected from a group consisting of lithium-cobalt-based components, lithium iron phosphate (LiFePO$_4$)-based components, lithium manganese iron phosphate (LiMnPO$_4$)-based components, lithium-manganese-based composites, lithium-nickel-based composites, lithium-cobalt-nickel-manganese-based components, the oxide components thereof and the arbitrary combinations thereof. In some other embodiments, the active material powder 103 may include some other conductive material 105. For example, the active material powder 103 may contain 0.5% to 20% of conductive material 105 by weight; and the conductive material 105 can be implemented by a plurality of metal particles essentially made of Al, Cu or Al/Cu alloy.

Figure 1D:
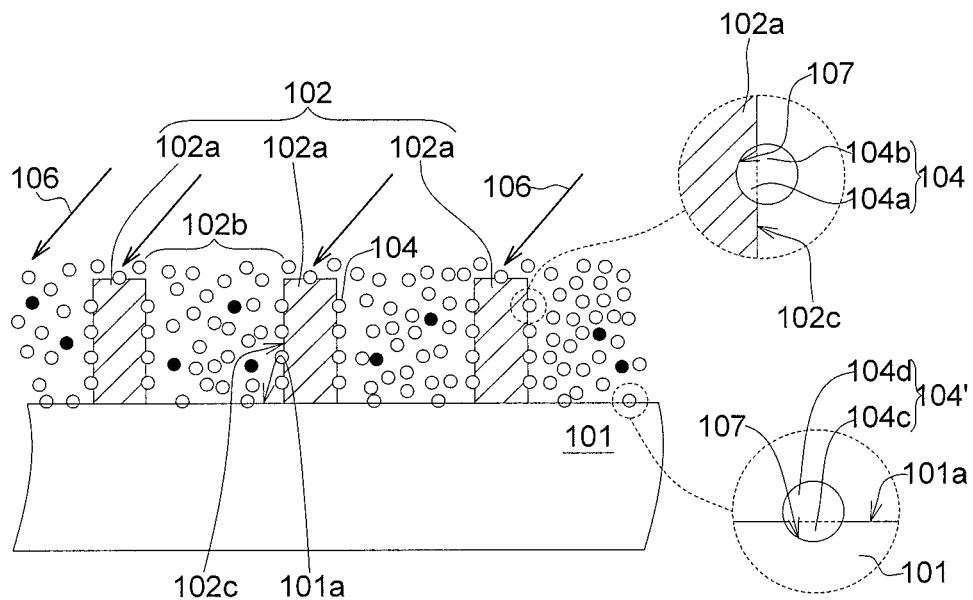

Subsequently, the focused beam of energy 106 is provided for sintering or melting the active material powder 103, so as to make the active particles 104 conformally engaged on the vertical sidewalls 102c of the patterned conductive layer 102 (see FIG. 1D). In some embodiments of the present disclosure, the active material powder 103 disposed on the patterned conductive layer 102 and the exposed surface 101a of the substrate 101 may be thoroughly subjected to the focused beam of energy 106, whereby the active particles 104 both disposed on the patterned conductive layer 102 and disposed on the exposed surface 101a of the substrate 101 can be sintered or melted. Such that the sintered or melted active particles 104 can be conformally engaged both on the vertical sidewalls 102c of the patterned conductive layer 102 and on the exposed surface 101a of the substrate 101. In some other embodiments, the focused beam of energy 106 may be directed merely to sinter or melt the active material powder 103 disposed on the patterned conductive layer 102 according to a predetermined laser scanning path, whereby merely the top surface and the vertical sidewalls 102c of the patterned conductive layer 102 have the sintered or melted active particles 104 conformally engaged thereon.

The way of providing the focused beam of energy 106 to sinter or melt the active material powder 103 includes steps of performing an APS process, a SLS process, a DMSL process, a SLM process, an EBM process or the arbitrary combinations thereof to sinter or melt the active material powder 103 and then curing the sintered or melted active material powder 103. In the present embodiment, a SLS process with an energy ranging from 5 W to 100 W is performed to sinter or melt the active material powder 103, whereby the sintered or melted active particles 104 can be conformally engaged on the top surface and the vertical sidewalls 102c of the patterned conductive layer 102 as well as the exposed surface 101a of the substrate 101.

Each of the sintered or melted active particles 104 engaged on the top surface and the vertical sidewalls of the patterned conductive layer 102 may have a first portion 104a conformally engaged with the top surface and the vertical sidewalls 102c of the patterned conductive layer 102 and a second portion 104b protruding outwards from the top surface and the vertical sidewalls 102c of the patterned conductive layer 102. Each of the sintered or melted active particles 104' engaged on the exposed surface 101a of the substrate 101 have a third portion 104c conformally engaged with the exposed surface 101a of the substrate 101 and a fourth portion 104d protruding outwards from the exposed surface 101a of the substrate 101. The ways of the sintered or melted active particles 104 and 104' conformally engaged with the patterned conductive layer 102 and the substrate 101 may vary dependent upon the material of the active particles 104 and 104' as well as the material of the patterned conductive layer 102 and the substrate 101 with which the active particles 104 and 104' engaged.

For example, when LiFePO$_4$-based ceramic particles serve as the active particles 104 and 104' to be conformally engaged with the grid structure of the patterned conductive layer 102 made of Cu and the substrate 101 made of Al. While the focused beam of energy 106 are directed to the active material powder 103, the sintered or melted active particles 104 and 104' (LiFePO$_4$-based ceramic particles) are may be maintained in a solid state, and the surface of the Cu grid structure and the exposed surface 101a of the Al substrate 101 may be in a molten state. Such that, a portion of the active particles 104 and 104' (the first portion 104a and the third portion 104c) may be emended into the melting surfaces of the Cu grid structure and the Al substrate 101, so as to define a plurality of recesses 107 on the top surface and the vertical sidewalls of the Cu grid structure and the exposed surface 101a of the substrate 101. After the melting surfaces of the Cu grid structure and the Al substrate 101 are cured, the first portion 104a and the third portion 104c of the active particles 104 and 104' (LiFePO$_4$-based ceramic particles) can be conformally embedded in the recesses 107; and the other portion of the active particles 104 and 104' (the second portion 104b and the fourth portion 104d) can extend outwards beyond the recesses 107 and protruding from the top surface and the vertical sidewalls 102c of the Cu grid structure and the exposed surface 101a of the substrate 101.

Figure 4:
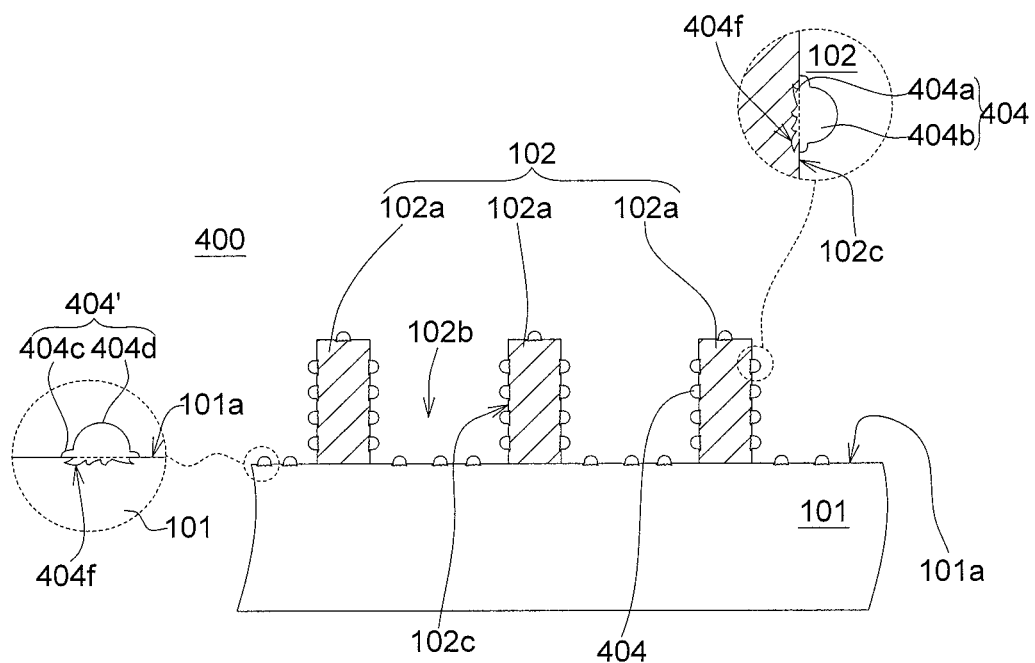
FIG. 4 is a cross-sectional view illustrating a battery electrode structure according to one embodiment of the present disclosure.

Alternatively, when Mg/Ni alloy particles serve as the active particles 404 and 404' to be conformally engaged with the Cu grid structure of the patterned conductive layer 102 and the Al substrate 101 (see FIG. 4). While the focused beam of energy 106 are directed to the active material powder 103, a portion of the active particles 404 and 404' (the first portion 404a and the third portion 404c) may be in a molten state and could be mixed with the melting surfaces of the Cu grid structure and the Al substrate 101. After the melting surfaces of the Cu grid structure and the Al substrate 101 as well as molten portion of the active particles 404 and 404' are cured, an alloy interface 404f may be formed between the the active particles 404 (404') and the top surface and the vertical sidewalls of the Cu grid structure (the exposed surface 101a of the substrate 101) and extending into the Cu grid structure and the Al substrate 101. The first portion 404a and the third portion 104c of the active particles 404 and 404' may conformally clade on the top surface and the vertical sidewalls of the Cu grid structure and the exposed surface 101a of the substrate 101; and the other portion of the active particles 404 and 404' (the second portion 404b and the fourth portion 404d) can extend outwards from the top surface and the vertical sidewalls 102c of the Cu grid structure and the exposed surface 101a of the substrate 101.

Figure 1E:
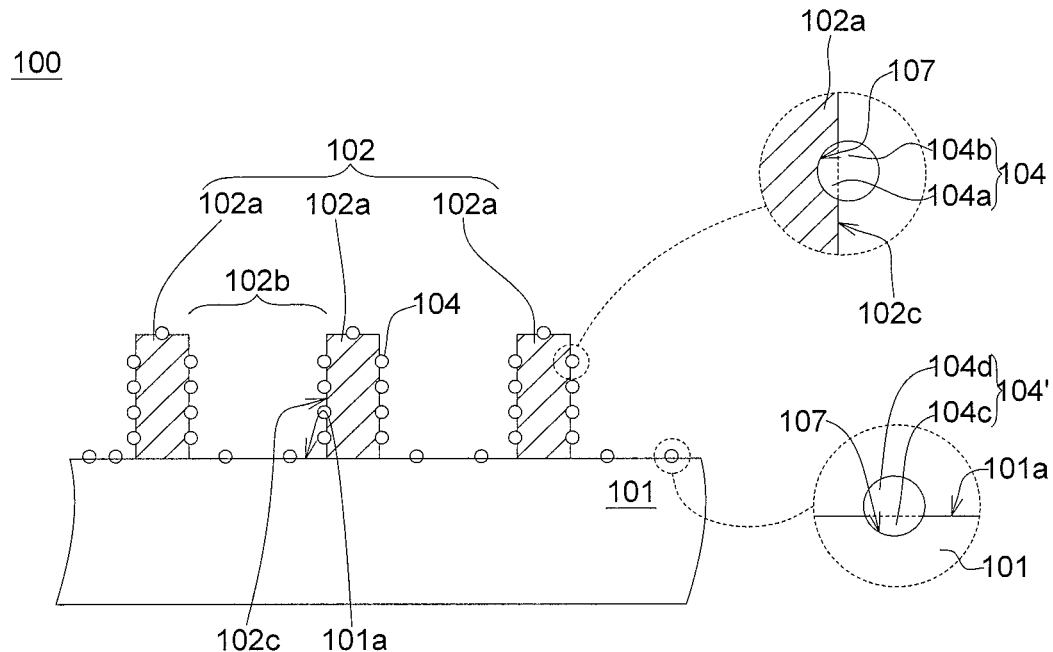

Subsequently, the unsintered and unmelted portion of the active material powder 103 is removed to form the battery electrode structure 100 as shown in FIG. 1E. Because the active particles 104, 104' and 404 are either conformally embedded in (see FIG. 1E) or conformally clade on (see FIG. 4) the vertical sidewalls 102c of the patterned conductive layer 102 and exposed surface 101a of the substrate 101. The active particles 104, 104' and 404 can be tightly engaged with the patterned conductive layer 102 and the substrate 101, and may not easily get loose therefrom due to the stress resulted from Li-intercalation generation and de-intercalation. As a result the life time of the secondary battery applying the battery electrode structure 100 can be improved.

In comparison with the secondary battery applying the traditional battery electrode structure that is formed by the paste preparation and coating technology. The secondary battery applying the battery electrode structure 100 may have 20% to 40% power capacity more than that of the traditional one, wherein the battery electrode structure 100 and the traditional battery electrode structure have an identical thickness. In addition, since the active particles 104, 104' and 404 can directly make an electrical contact with the patterned conductive layer 102 and the substrate 101, thus increasing the density of the active particles 104, 104' and 404, the thickness of the patterned conductive layer 102 and the surface area of the vertical sidewalls 102c may not deteriorate the charge transfer efficiency of the secondary battery. In other words, the battery capacity of the secondary battery applying the battery electrode structure 100 can be also improved by this ways without deteriorate the charge transfer efficiency thereof.

For example, the battery capacity of the secondary battery applying the battery electrode structure of the present disclosure can be improved by increasing the thickness of the patterned conductive layer. FIGS. 5A to 5D are cross-sectional views illustrating the method for fabricating a battery electrode structure 500 according to another embodiment of the present disclosure. Since some steps for forming the battery electrode structures 100 and 500 may be identical, thus the identical steps can be omitted for the purpose of description convenience, and the process for forming the battery electrode structure 500 may be continued from the step depicted in FIG. 1D. The method for fabricating the battery electrode structure 500 includes steps as follows: The conductive powder 108 is provided again to cover on the surface 101a of the substrate 101 and the patterned conductive layer 102 (see FIG. 5A).

Figure 5A:
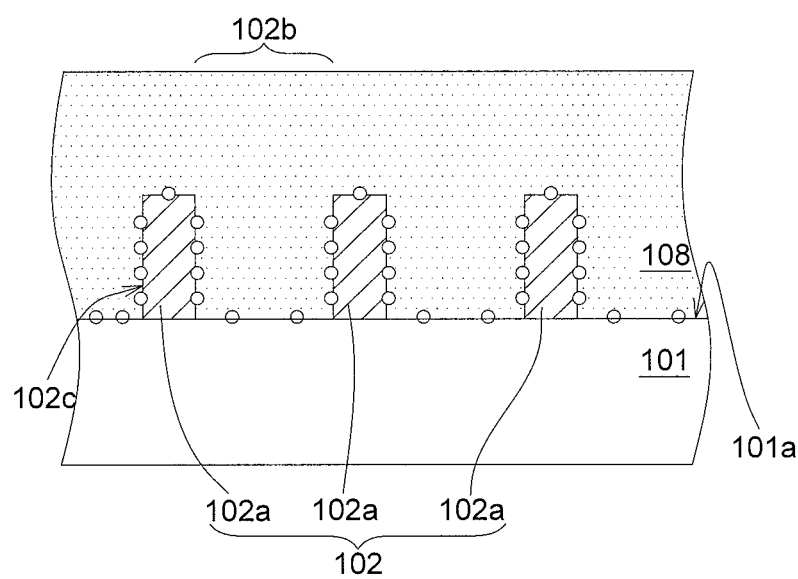
FIGS. 5A to 5D are cross-sectional views illustrating the method for fabricating a battery electrode structure according to another embodiment of the present disclosure.
Figure 5B:
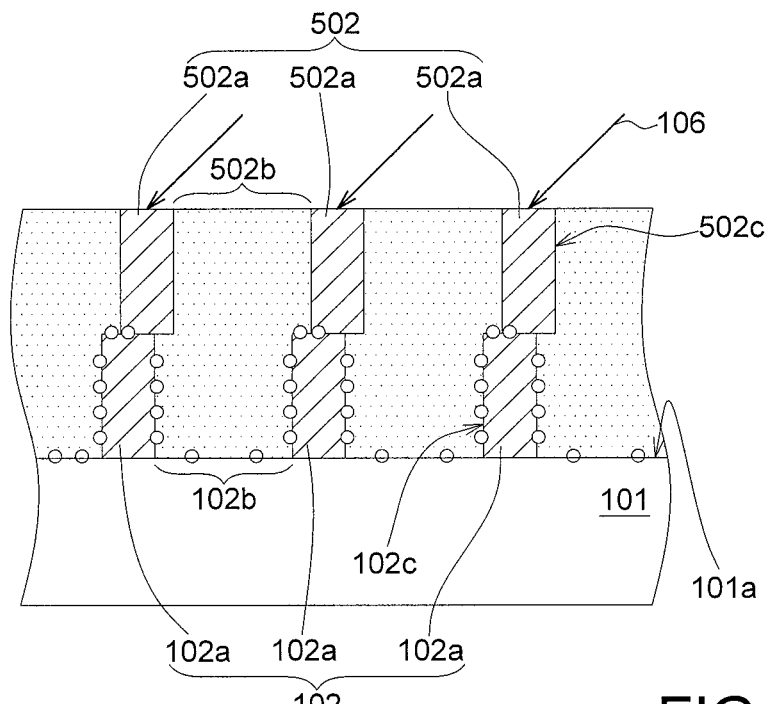
Figure 5C:
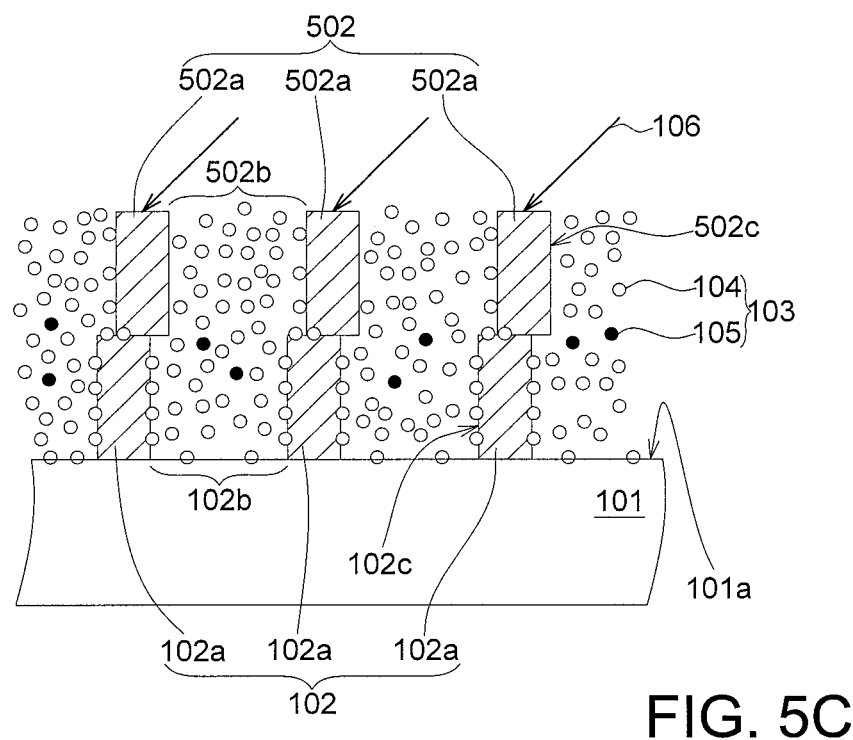

The focused beam of energy 106, such as a laser beam, an electron beam, an arc energy or the arbitrary combinations thereof is then directed to the surface 101a of the substrate 101 for sintering or melting the conductive powder 108 according to a predetermined laser scanning path, so as to form a patterned conductive layer 502 having a grid structure on the patterned conductive layer 102 (as shown in FIG. 5B). In the present embodiment, the patterned conductive layer 502 has a plurality of openings 502b each of which may at least partially overlap with one opening 102b of the patterned conductive layer 102 correspondently. However, in some other embodiments of the present disclosure, each of the openings 502b can thoroughly overlap with the corresponding opening 102b of the patterned conductive layer 102.

Figure 5D:
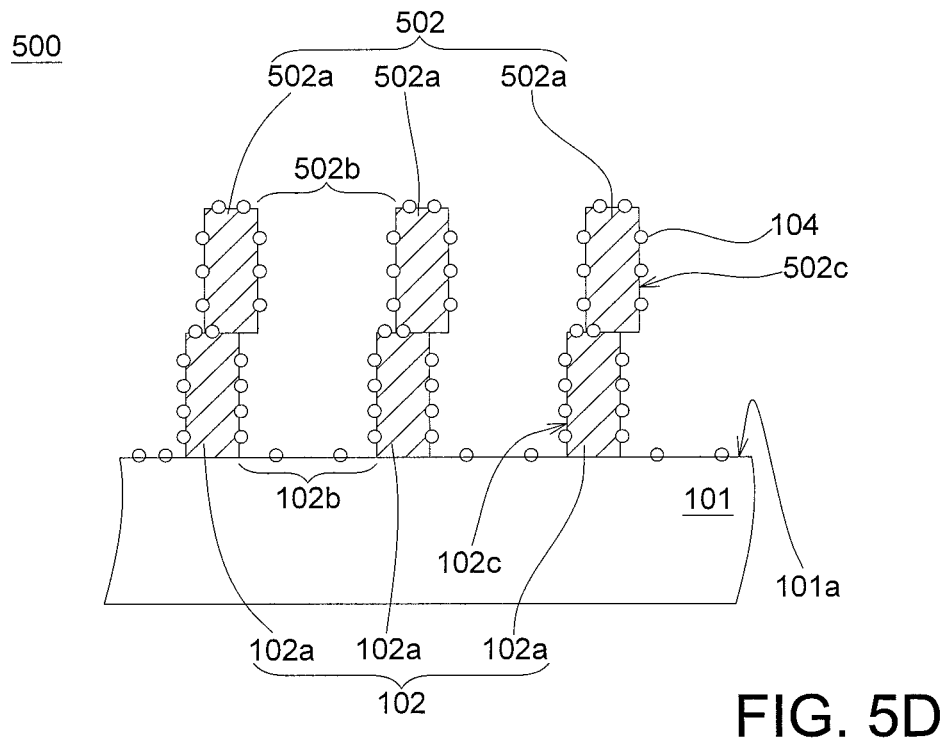

After the unsintered and unmelted portion of the conductive powder 108 is removed, the active material powder 103 including a plurality of active particles 104 is provided again to cover the patterned conductive layer 502 and the portion of the surface 101a of the substrate 101 exposed from the openings 502b. The focused beam of energy 106 is provided again for sintering or melting the active material powder 103, so as to make the active particles 104 conformally engaged on the vertical sidewalls 502c of the patterned conductive layer 502 (see FIG. 5C). Subsequently, the unsintered and unmelted portion of the active material powder 103 is removed to form the battery electrode structure 500 as shown in FIG. 5D.

Figure 6:
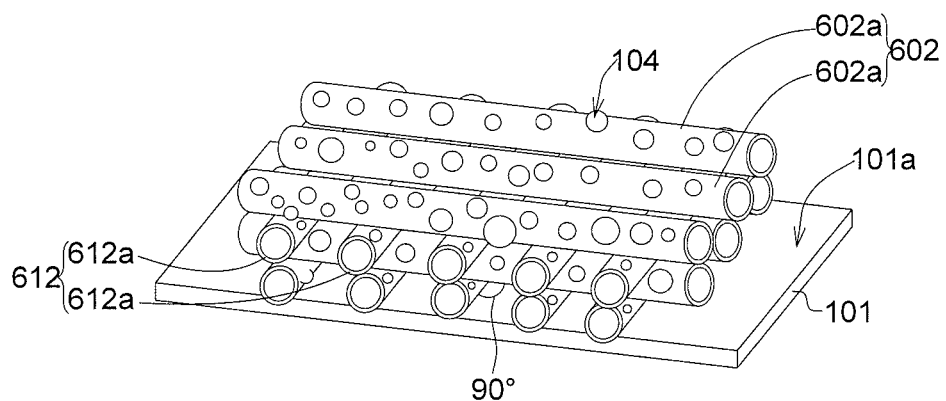
FIG. 6 is a perspective view illustrating a partial battery electrode structure having a plurality of patterned conductive layer stacked with each other according to one embodiment of the present disclosure.
Figure 7:
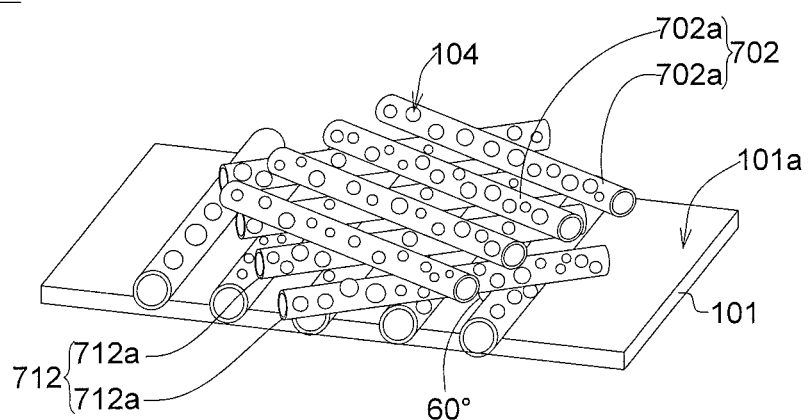
FIG. 7 is a perspective view illustrating a partial battery electrode structure having a plurality of patterned conductive layer stacked with each other according to another embodiment of the present disclosure.
Figure 8:
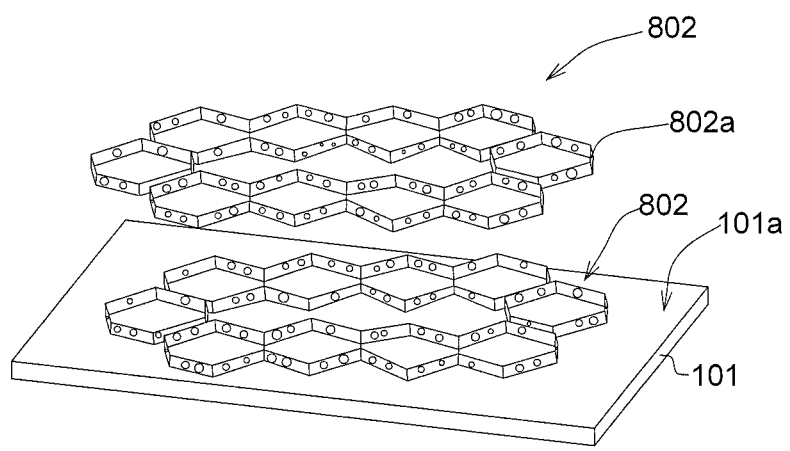
FIG. 8 is a perspective view illustrating a partial battery electrode structure having a plurality of patterned conductive layer stacked with each other according to yet another embodiment of the present disclosure.

The arrangement of the stacked patterned conductive layers may not be limited to this regards. FIGS. 6 to 8 are perspective views illustrating partial battery electrode structures 600, 700 and 800 according to various embodiments of the present disclosure. Each of the battery electrode structures 600, 700 and 800 has at least two patterned conductive layers stacked with each other, and these at least two patterned conductive layers may misalign with each other.

For example, in the embodiment depicted in FIG. 6, the metal bumpings 602a used to constitute the grid structure on the patterned conductive layer 602 and the metal bumpings 612a used to constitute the grid structure on the patterned conductive layer 612 are shaped as a plurality of long straight bars and intersected with each other to form an angle about 60°, wherein the grid structure on the patterned conductive layer 602 misalign with the grid structure on the patterned conductive layer 612, although these two grid structure on the patterned conductive layer 602 and 612 are stacked with each other. In the embodiment depicted in FIG. 7, the metal bumpings 702a used to constitute the grid structure on the patterned conductive layer 702 and the metal bumpings 712a used to constitute the grid structure on the patterned conductive layer 712 are shaped as a plurality of long straight bars and intersected with each other to form a right angle, wherein the grid structure on the patterned conductive layer 702 and the grid structure 712 form an orthogonally-stacked structure. In the embodiment depicted in FIG. 8, the battery electrode structure 800 includes a plurality of patterned conductive layers 802 constituted by a plurality of mesh-shaped metal bumpings 802a; and the patterned conductive layers 802 are stacked with each other.

FIGS. 9A to 9E are cross-sectional views illustrating the method for fabricating a battery electrode structure 900 according to yet another embodiment of the present disclosure. The method for fabricating the battery electrode structure 900 includes steps as follows: A substrate 101 is firstly provided. A patterned conductive layer 902 is then formed on a surface 101a of the substrate 101.

In some embodiments of the present disclosure, the patterned conductive layer 902 can be formed by following steps: A conductive powder 108 (including metal materials, Ti, Au, Ag, Fe, Al, Cu or the alloys constituted by the arbitrary combinations thereof) is provided to thoroughly cover on the surface 101a of the substrate 101 (see FIG. 9A). A focused beam of energy 106, such as a laser beam, an electron beam, an arc energy or the arbitrary combinations thereof is directed to the thorough surface 101a of the substrate 101 for sintering or melting the conductive powder

108. Subsequently, the unsintered and unmelted portion of the conductive powder 108 is removed (see FIG. 9B).

Figure 9A:
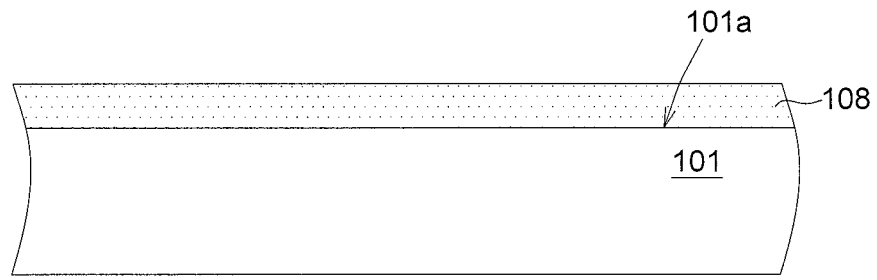
FIGS. 9A to 9E are cross-sectional views illustrating the method for fabricating a battery electrode structure according to yet another embodiment of the present disclosure.
Figure 9B:
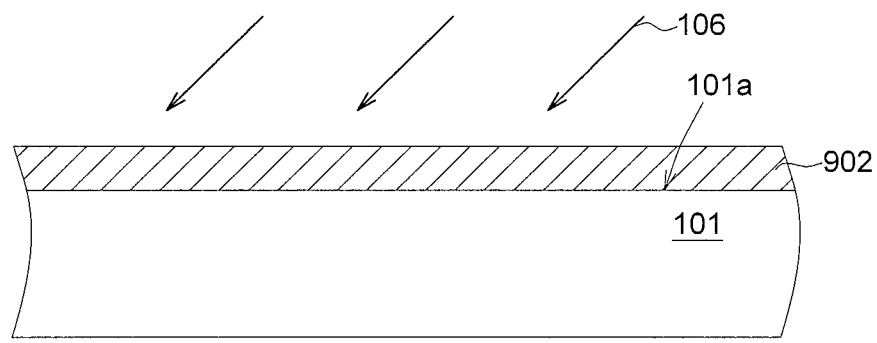
Figure 9C:
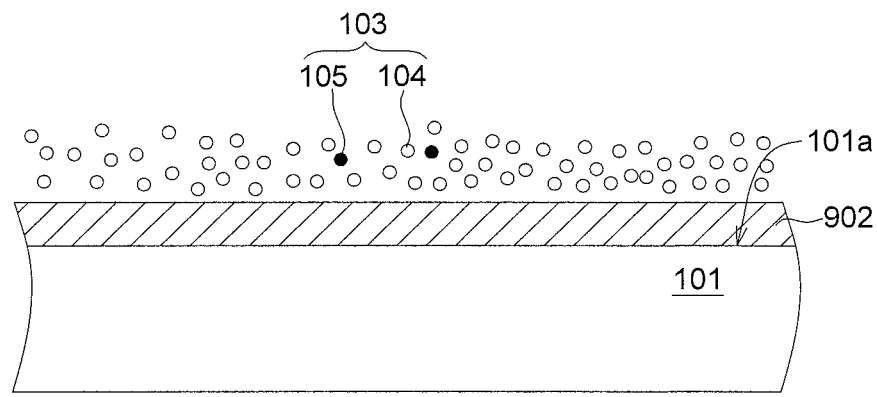

Next, an active material powder 103 including a plurality of active particles 104 is provided to cover the patterned conductive layer 902 (as shown in FIG. 9C). In some embodiments of the present disclosure, each of the active particles 104 may include an anode material which can be one of Li, C), Si, Mg, Cu, Ni, Al, Ti, Sn, the alloys and the oxide components thereof. For example, the active particles 104 can be porous Si—C ceramic particles, Si—C—Cu ceramic particles, Si—Cu ceramic particles, Mg/Ni/Si ceramic particles, Mg/Ni alloy particles, or the arbitrary combinations thereof. In some other embodiments of the present disclosure, each of the active particles 104 may include a cathode material which can be selected from a group consisting of lithium-cobalt-based composites, $LiFePO_4$-based composites, $LiMnPO_4$-based composites, lithium-manganese-based composites, lithium-nickel-based, lithium-cobalt-nickel-manganese-based composites, the oxide components thereof and the arbitrary combinations thereof. In some embodiments, the active material powder 103 may include some other conductive material 105. For example, the active material powder 103 may contain 0.5% to 20% of conductive material 105 by weight; and the conductive material 105 can be implemented by a plurality of metal particles essentially made of Al, Cu or Al/Cu alloy.

Figure 9D:
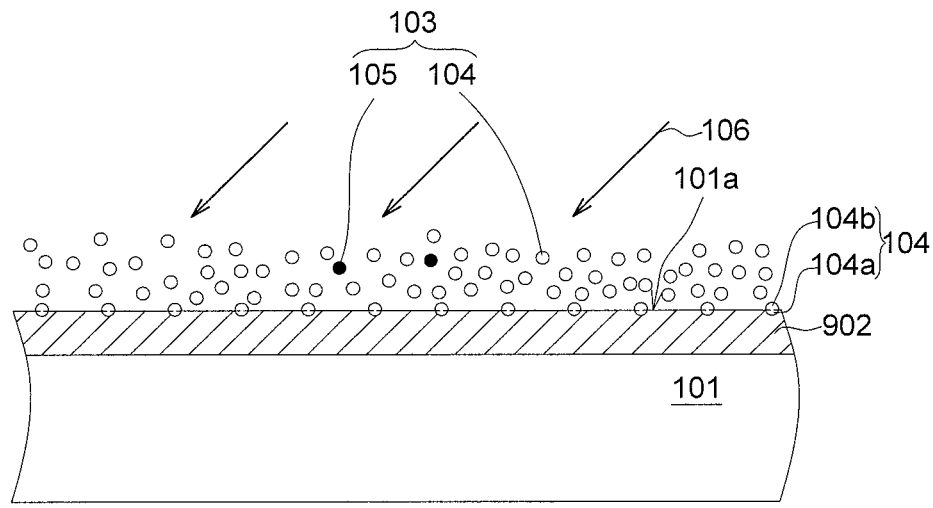

Thereinafter, the focused beam of energy 106 is provided for sintering or melting the active material powder 103, so as to make the active particles 104 conformally engaged on the top surface of the patterned conductive layer 902 (see FIG. 9D). In the present embodiment, the focused beam of energy 106 is directed to sinter or melt the active material powder 103 disposed on the patterned conductive layer 902, whereby the sintered or melted active particles 104 can be conformally engaged on the top surface of the patterned conductive layer 902. Each of the sintered or melted active particles 104 may have a first portion 104a conformally engaged with the top surface of the patterned conductive layer 902 and a second portion 104b protruding outwards from the top surface of the patterned conductive layer 902.

Figure 9E:
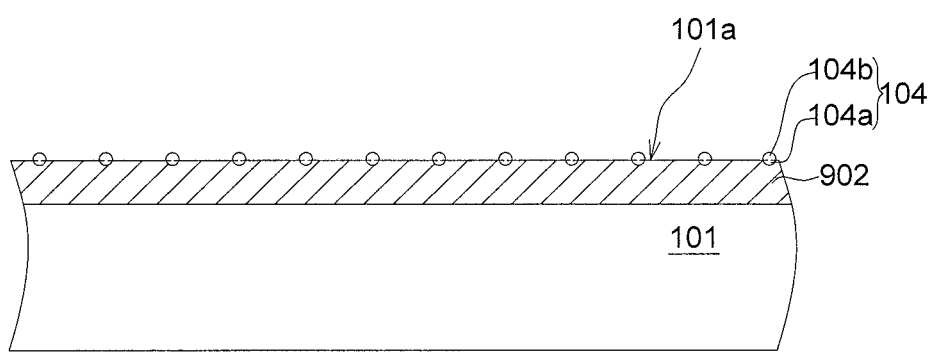

Subsequently, the unsintered and unmelted portion of the active material powder 103 is removed to form the battery electrode structure 900 as shown in FIG. 9E. Because the active particles 104 and 404 are either conformally embedded in (see FIG. 9E) or conformally clade on (see FIG. 4) the patterned conductive layer 902. The active particles 104 and 404 can be tightly engaged with the patterned conductive layer 902, and may not easily get loose therefrom due to the stress resulted from Li-intercalation generation and de-intercalation. As a result the life time of the secondary battery applying the battery electrode structure 900 can be improved.

Figure 10A:
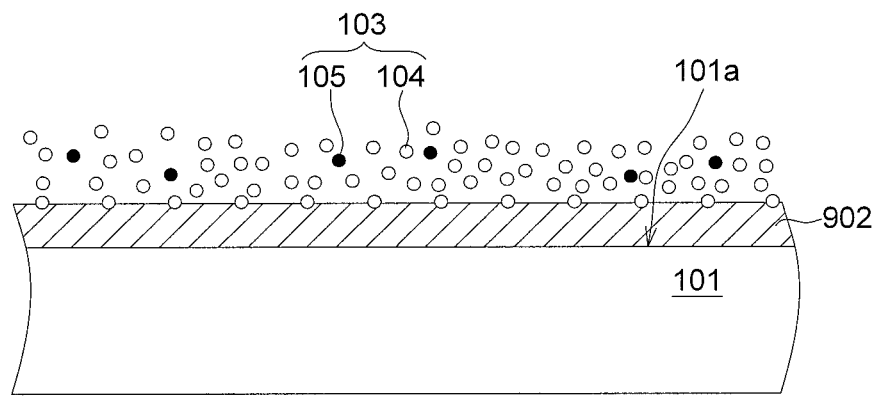
FIGS. 10A to 10C are cross-sectional views illustrating the method for fabricating a battery electrode structure according to yet another embodiment of the present disclosure.
Figure 10B:
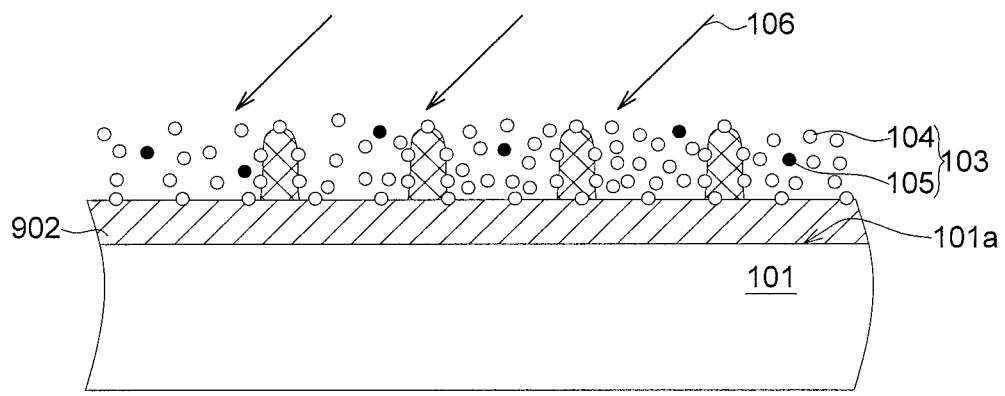
Figure 10C:
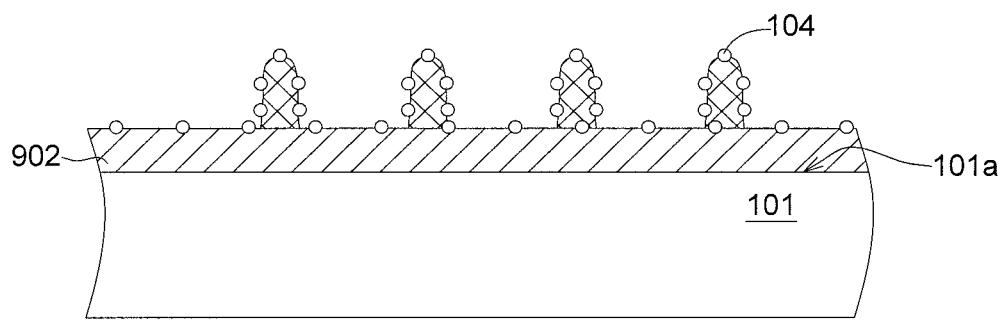

The battery capacity of the secondary battery applying the battery electrode structure 900 also can be improved by increasing the thickness of the active particles 104. FIGS. 10A to 10C are cross-sectional views illustrating the method for fabricating a battery electrode structure 1000 according to yet another embodiment of the present disclosure. Since some steps for forming the battery electrode structures 900 and 1000 may be identical, thus the identical steps can be omitted for the purpose of description convenience, and the process for forming the battery electrode structure 1000 can be continued from the step depicted in FIG. 9E. The method for fabricating the battery electrode structure 1000 includes steps as follows:

An active material powder 103 including a plurality of active particles 104 is provided to cover the patterned conductive layer 902 (as shown in FIG. 10A). In the present embodiment, the active material powder 103 may include more other conductive material 105 than that provided in FIG. 9C. Thereinafter, the focused beam of energy 106 is provided for sintering or melting the active material powder 103, so as to form a plurality of stack structures having a plurality of the active particles 104 engaged therein (as shown in FIG. 10B) on the top surface of the patterned conductive layer 902. Subsequently, the unsintered and unmelted portion of the active material powder 103 is removed to form the battery electrode structure 1000 as shown in FIG. 10C.

In the present embodiment of the present disclosure, the focused beam of energy 106 is directed to the patterned conductive layer 902 for sintering or melting the active material powder 103 according to a predetermined laser scanning path, during the process for forming the stack structures having active particles 104 engaged thereon. However, in some other embodiment s of the present disclosure, the active material powder 103 may not be thoroughly subjected to the focused beam of energy 106, whereby a thick layer (not shown) having a plurality of the active particles 104 engaged therein may be formed on the patterned conductive layer 902.

According to one embodiment of the present disclosure, a battery electrode structure is provided. A conductive layer is firstly formed on a substrate, and a plurality of active particles are then engaged with the conductive layer by a sintering/melting technology, wherein each of the active particles has a first portion conformally engaged with a surface of the conductive layer and a second portion protruding outwards from the surface of the conductive layer.

Since the active particles can be tightly engaged with the conductive layer, and may not easily get loose therefrom due to the stress resulted from Li-intercalation generation and de-intercalation. As a result the life time of the secondary battery applying the battery electrode structure provided by the embodiments of the present disclosure can be improved. In addition, since the active particles can directly make an electrical contact with the conductive layer, thus battery capacity of the secondary battery can be improved by increasing the density of the active particles, the thickness and the stacking number of the conductive layer without deteriorate the charge transfer efficiency thereof. As a result, the objects of obtaining a secondary battery having advantages of low manufacturing cost, high cycle life and battery capacity can be achieved by the embodiments of the present disclosure.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A battery electrode structure comprising:
a substrate, having a substrate surface;
a first conductive layer disposed on the substrate surface, wherein the first conductive layer comprises a metal material selected from a group consisting of titanium (Ti), gold (Au), silver (Ag), iron (Fe), aluminum (Al), copper (Cu)and the combinations thereof; and
a plurality of first active particles, each of the first active particles has a first portion conformally engaged with a surface of the first conductive layer and a second portion protruding outwards from the surface of the first conductive layer;

wherein each of the first active particles comprises a ceramic material selected from a group consisting of Si—C—Cu ceramic, Si—Cu ceramic, Mg/Ni/Si ceramic and the arbitrary combinations thereof.

2. The battery electrode structure according to claim 1, wherein the first conductive layer is a patterned conductive layer having at least one conductive bumping forming a non-straight angle with the substrate surface.

3. The battery electrode structure according to claim 2, wherein a first grid structure having a plurality of first openings is define by the at least one conductive bumping, and a portion of the substrate surface is exposed from the first openings.

4. The battery electrode structure according to claim 3, further comprising a plurality of second active particles, each of the second active particles has a third portion conformally engaged with the exposed portion of the substrate surface and a second portion protruding outwards from the exposed portion of the substrate surface.

5. The battery electrode structure according to claim 3, wherein the at least one first opening has an average width ranging from 10 micrometers (μm) to 200 μm; and the first active particles have an average grain size ranging from 1 μm to 10 μm.

6. The battery electrode structure according to claim 3, further comprising a second conductive layer disposed on the first conductive layer and used to define a second grid structure having a plurality of second openings, wherein each of the second openings overlaps one of the first opening.

7. The battery electrode structure according to claim 2, wherein the first portion is embedded in a recess formed on in the conductive bumping; and the second portion extends outwards beyond the recess.

8. A battery electrode structure comprising:
a substrate, having a substrate surface;
a first conductive layer disposed on the substrate surface, wherein the first conductive layer comprises a metal material selected from a group consisting of Ti, Au, Ag, Fe, Al, Cu and the combinations thereof; and the first conductive layer is a patterned conductive layer having at least one conductive bumping forming a non-straight angle with the substrate surface; and
a plurality of first active particles, each of the first active particles comprises magnesium (Mg)/nickel (Ni) alloy, and has a first portion conformally engaged with a surface of the first conductive layer and a second portion protruding outwards from the surface of the first conductive layer; wherein the first portion has an alloy interface extending from a surface of the conductive bumping into the conductive bumping; and the second portion extends outwards from the surface of the conductive bumping.

9. A method for fabricating the battery electrode structure of claim 8, comprising:

providing a substrate having a substrate surface;
forming a first conductive layer on the substrate surface; and
sintering or melting a plurality of active particles disposed on a surface of the first conductive layer, so as to make each of the active particles having a first portion conformally engaged with the surface of the first conductive layer and a second portion protruding outwards from the surface of the first conductive layer.

10. The method according to claim 9, wherein the step of forming the first conductive layer comprises:
providing a conductive powder 108 to cover on the substrate surface; and
directing a focused beam of energy to the substrate surface for sintering or melting the conductive powder.

11. The method according to claim 10, wherein the step of forming the first conductive layer comprises directing the focused beam of energy to sinter or melt the conductive powder, so as to form at least one conductive bumping and define a first grid structure having a plurality of first openings.

12. The method according to claim 11, wherein the step of sintering or melting the active particles comprises:
providing an active material powder to cover on the first conductive layer; and
directing the focused beam of energy to the active material powder.

13. The method according to claim 12, after sintering or melting the active particles, further comprising:
forming a second conductive layer disposed on the first conductive layer and used to define a second grid structure having a plurality of second openings, wherein each of the second openings overlaps one of the first opening;
providing the active material powder to cover on the second conductive layer; and
directing the focused beam of energy to the active material powder.

14. The method according to claim 12, wherein the focused beam of energy is selected from a group consisting of a laser beam, an electron beam, an arc energy and the arbitrary combinations thereof.

15. The method according to claim 9, wherein each of the active particles comprises an anode material selected from a group consisting of Li, C, Si, Mg, Cu, Ni, Al, Ti, Sn and the arbitrary combinations thereof.

16. The method according to claim 9, wherein each of the active particles comprises a cathode material selected from a group consisting of lithium-cobalt-based composites, $LiFePO_4$-based composites, lithium $LiMnPO_4$-based composites, lithium-manganese-based composites, lithium-nickel-based composites, lithium-cobalt-nickel-manganese-based composites and the arbitrary combinations thereof.

17. The method according to claim 9, wherein the first conductive layer comprises a metal material selected from a group consisting of Ti, Au, Ag, Fe, Al, Cu and the combinations thereof.

* * * * *